United States Patent
Aunspach (10) Patent No.: US 8,382,594 B2
(45) Date of Patent: Feb. 26, 2013

(54) TORQUE LIMITER AND METHOD OF LIMITING TORQUE TRANSFER

(75) Inventor: Dale E. Aunspach, High Ridge, MO (US)

(73) Assignee: Aunspach Controls Company, High Ridge, MO (US)

( * ) Notice: Subject to any disclaimer, the term of this patent is extended or adjusted under 35 U.S.C. 154(b) by 0 days.

(21) Appl. No.: 13/178,652

(22) Filed: Jul. 8, 2011

(65) Prior Publication Data

US 2013/0012325 A1    Jan. 10, 2013

(51) Int. Cl.
*F16D 7/06* (2006.01)
(52) U.S. Cl. ........................... 464/36; 192/56.62
(58) Field of Classification Search ............. 464/36, 464/38, 39, 43, 44, 46, 47; 192/56.53, 56.54, 192/56.56, 56.57, 56.61, 56.62; 29/407.01, 29/407.02, 407.03, 407.05, 407.08, 446, 29/525.01
See application file for complete search history.

(56) References Cited

U.S. PATENT DOCUMENTS

| | | | | |
|---|---|---|---|---|
| 2,587,712 | A | * | 3/1952 | Dodge ...................... 464/36 X |
| RE25,274 | E | * | 10/1962 | Hayes ...................... 192/56.54 |
| 3,287,935 | A | * | 11/1966 | Grunbaum .................. 464/47 |
| 3,667,250 | A | * | 6/1972 | Schnepel .................... 464/36 |
| 3,942,337 | A | * | 3/1976 | Leonard et al. ............. 464/36 |
| 4,176,733 | A |   | 12/1979 | Twickler |
| 4,545,470 | A |   | 10/1985 | Grimm |
| 4,610,339 | A |   | 9/1986 | Ciolli |
| 4,793,120 | A |   | 12/1988 | Herzog |
| 5,067,600 | A |   | 11/1991 | Koller |
| 5,672,110 | A |   | 9/1997 | Kurita et al. |
| 5,855,517 | A | * | 1/1999 | Lepold ...................... 464/36 |
| 7,503,443 | B1 | * | 3/2009 | Dobras ................. 464/36 X |
| 7,591,326 | B2 |   | 9/2009 | Ikuta |
| 2011/0000347 | A1 |   | 1/2011 | Stark |

FOREIGN PATENT DOCUMENTS

SU        1518586 A  * 10/1989
SU        1735636 A1 *  5/1992

* cited by examiner

*Primary Examiner* — Gregory Binda
*Assistant Examiner* — Matthieu Setliff
(74) *Attorney, Agent, or Firm* — Thompson Coburn LLP (57) ABSTRACT

A torque limiter comprises a first body, a second body, and a biasing mechanism. The second body is rotationally attached relative to the first body. The biasing mechanism comprises at least first and second compression springs and an adjustment device. The first spring has a maximum compression condition. The first and second springs are configured and adapted to create a torque-threshold below which the second body cannot be rotated relative to the first body and above which it can. The torque-threshold is adjustable via the adjustment device throughout a first torque range and a non-overlapping second torque range. The biasing mechanism is configured and adapted such that the first spring progressively compresses as the torque-threshold increases throughout the first torque range, and such that throughout the second torque range the first spring is in its maximum compression condition and the second spring progressively compresses as the torque-threshold increases.

21 Claims, 5 Drawing Sheets

TORQUE LIMITER AND METHOD OF LIMITING TORQUE TRANSFER

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to a torque limiter. More specifically the present invention pertains to a torque limiter having multiple compression springs. The torque limiter prevents torque above an adjustable torque-threshold from being transferred between two bodies of the device.

2. General Background

Torque limiters are used for a variety of purposes. One such purpose is to prevent damage to one or more components of an assembly by limiting how much torque can be transmitted from one component to another. By connecting the two components to each other via a torque limiter, only torque below a set torque-threshold of the torque limiter can be transferred through the torque limiter. For example, the first component could be a valve handle and the second component could be the shaft of a valve gate. By connecting the handle to a torque limiter, excessively high torque cannot be applied to the shaft of a valve gate by turning the valve handle.

One common type of torque limiter is a ball detent torque limiter. A ball detent torque limiter comprises a plurality of ball bearings that are spring biased into a plurality of detents. An excessively high torque will cause the balls to counteract the spring bias and move out of the detents. When the balls are out of the detents, the torque limiter generally becomes incapable of transferring torque (i.e., rotational slippage occurs). By adjusting the biasing force of the springs, the torque-threshold (i.e., the torque above which rotational slippage occurs) can be adjusted. Because of their compact size, ball detent torque limiters often use Belleville compression springs to generate the biasing forces. Nonetheless, most torque limiters have a relatively limited range over which the torque-threshold can be set or have cumbersome means for adjusting the torque-threshold.

SUMMARY OF THE INVENTION

A torque limiter in accordance with the present invention has a relatively large range between the lowest torque-threshold and the highest torque-threshold that can be set. Moreover, the torque-threshold of a torque limiter in accordance with the present invention can be set with relative ease at either end of the torque-threshold range.

In one aspect of the invention, a torque limiter comprises a first body and a second body. The second body is rotationally attached to the first body about an axis. The torque limiter also comprises a biasing mechanism. The biasing mechanism comprises at least first and second compression springs and an adjustment device. The first compression spring has a maximum compression condition. The first and second compression springs are configured and adapted to create a torque-threshold below which the second body cannot be rotated about the axis relative to the first body and above which the second body can be rotated about the axis relative to the first body. The torque-threshold is adjustable via the adjustment device throughout a first torque range and a non-overlapping second torque range. The biasing mechanism is configured and adapted such that the first compression spring progressively compresses as the torque-threshold increases throughout the first torque range, and such that the first compression spring is in its maximum compression condition and the second compression spring progressively compresses as the torque-threshold increases throughout the second torque range.

Another aspect of the invention involves a method of limiting torque transfer between first and second assembled bodies. The first and second bodies are rotationally attached to each other about an axis. The method comprises adjusting a biasing mechanism. The biasing mechanism comprises at least first and second compression springs and an adjustment screw. The first compression spring has a maximum compression condition. The first and second compression springs are configured and adapted to create a torque-threshold below which the second body cannot be rotated about the axis relative to the first body and above which the second body can be rotated about the axis relative to the first body. The torque-threshold is adjustable via the adjustment screw throughout a first torque range and a non-overlapping second torque range. The biasing mechanism is configured and adapted such that the first compression spring progressively compresses as the torque-threshold increases throughout the first torque range, and such that the first compression spring is in its maximum compression condition and the second compression spring progressively compresses as the torque-threshold increases throughout the second torque range. The adjusting of the biasing mechanism comprises rotating the adjustment screw.

In yet another aspect of the invention, a torque limiter comprises a first body and a second body. The first body comprises a plurality of detents. The second body is rotationally attached to the first body an axis. The second body comprises a plurality of axial through-holes that are spaced circumferentially about the axis. The torque limiter also comprises an intermediate member that is operatively rigid. Furthermore, the torque limiter comprises a plurality of bearings and first and second compression springs. Each bearing extends through a respective one of the through-holes of the second body. The first and second compression springs each have a spring constant. The spring constant of the second compression spring is greater than the spring constant of the first compression spring. Still further, the torque limiter comprises an adjustment device that is moveably attached to the first body. The adjustment device forces the first compression spring toward the intermediate member in a manner such that the intermediate member forces the second compression spring toward the bearings and thereby resiliently biases the bearings partially into the detents.

Further features and advantages of the present invention, as well as the operation of the invention, are described in detail below with reference to the accompanying drawings.

Reference numerals in the written specification and in the drawing figures indicate corresponding items.

DETAILED DESCRIPTION

A torque limiter in accordance with the invention is generally represented by the numeral 10 as shown in FIGS. 1-5. The torque limiter 10 comprises a first body 12 and a second body 14 that are pivotally connected to each other. The first body 12 comprises a baseplate 16 and a cap 18 that are fixed to each other via a plurality of screws 20. The baseplate 16 and cap 18 together form an internal cavity 22. The baseplate comprises a central opening 24 that is operatively connected to the internal cavity 22. The baseplate 16 also comprises a plurality of detent dimples 26 that are spaced circumferentially around the central opening 24 within the internal cavity 22. The cap 18 comprises an adjustment screw hole 28 and a plurality of threaded mounting bolt holes 30. The mounting bolt holes 30 are configured to adapted to facilitate the attachment of other components, such as a handle (not shown) to the first body 12 of the torque limiter 10.

Figure 3:
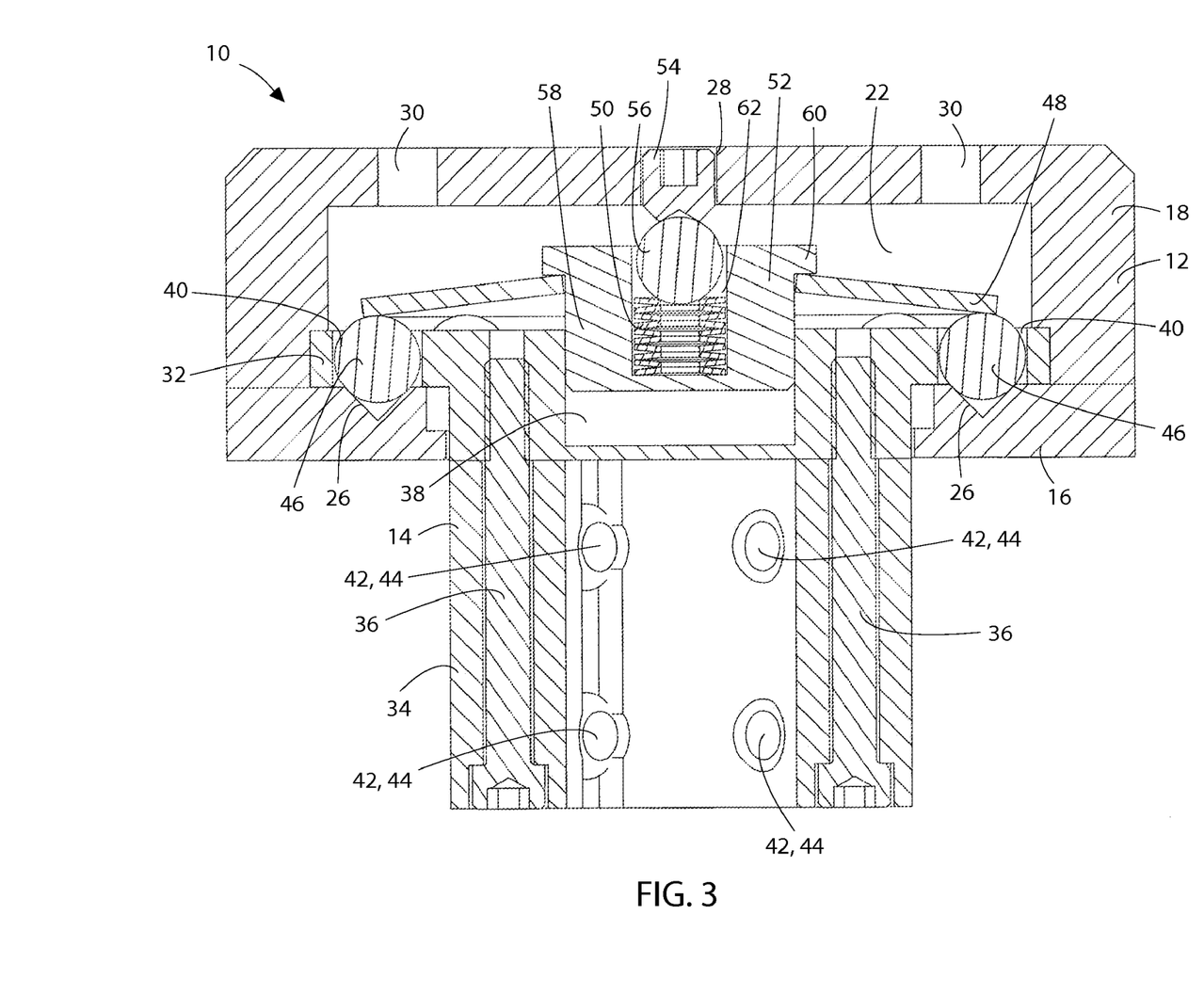
FIG. 3 is a cross-sectional view of the torque limiter shown in FIGS. 1 and 2 with the torque-threshold being set at a low torque level.
Figure 4:
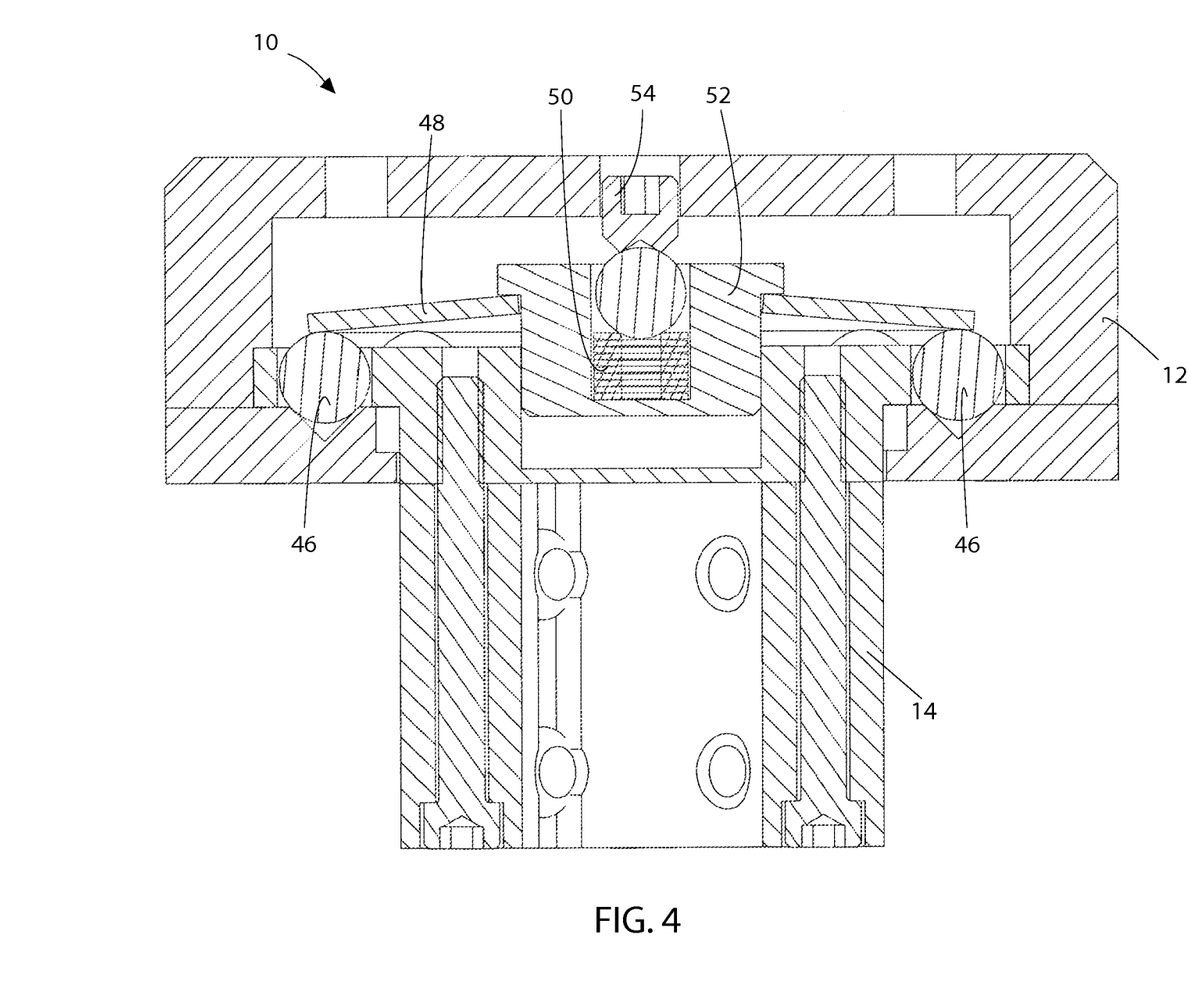
FIG. 4 is a cross-sectional view of the torque limiter shown in FIGS. 1 and 2 with the torque-threshold being set at a medium torque level.
Figure 5:
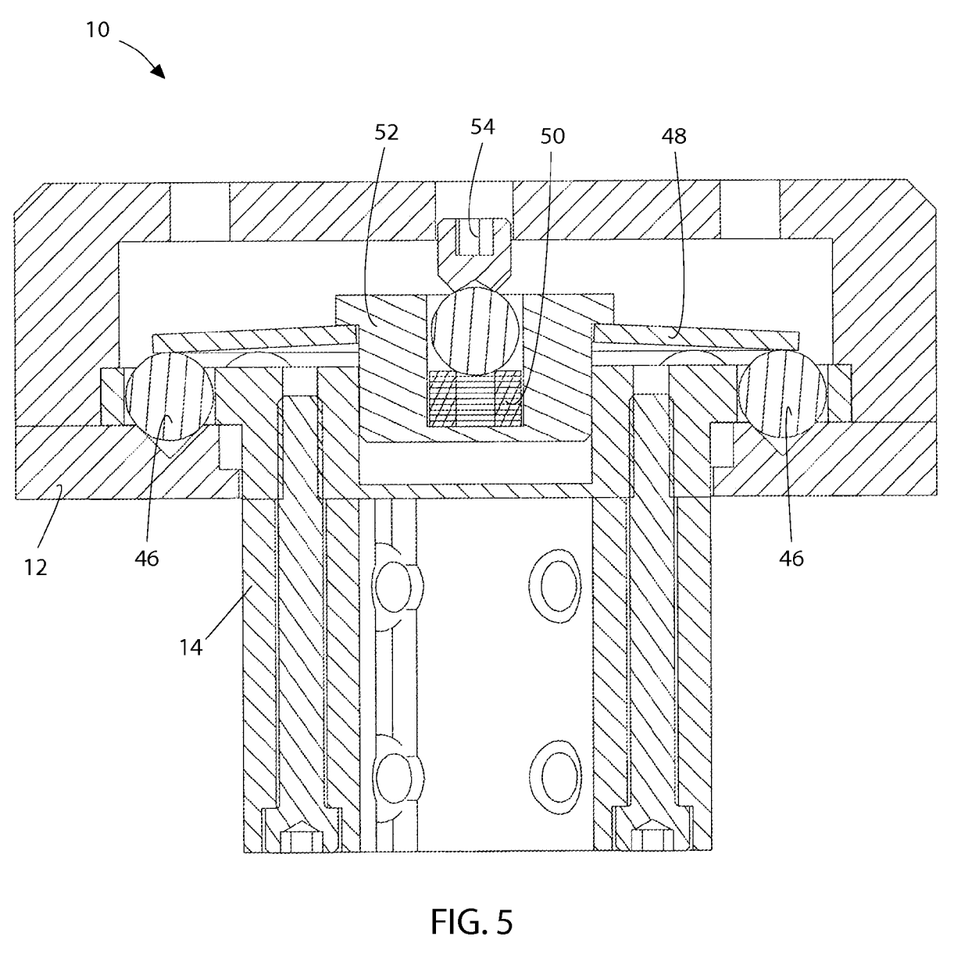
FIG. 5 is a cross-sectional view of the torque limiter shown in FIGS. 1 and 2 with the torque-threshold being set at a high torque level.

The second body 14 comprises a disk-shaped portion 32 and cylindrical sleeve 34 that are fixed to each other via a plurality of bolts 36 (see FIGS. 3-5). The disk-shaped portion 32 comprises a centrally positioned cylindrical pocket 38 and a plurality of axially oriented detent ball holes 40 that are circumferentially spaced around the cylindrical pocket 38. The sleeve 34 comprises a plurality of setscrew holes 42 that are configured and adapted to receive setscrews 44 for use in securing the second body to a shaft of another device (not shown). The disk-shaped portion 32 of the second body 14 is positioned within the internal cavity 22 of the first body 12 and the sleeve 34 extends through the central opening 24 of the baseplate 16 of the first body.

Figure 1:
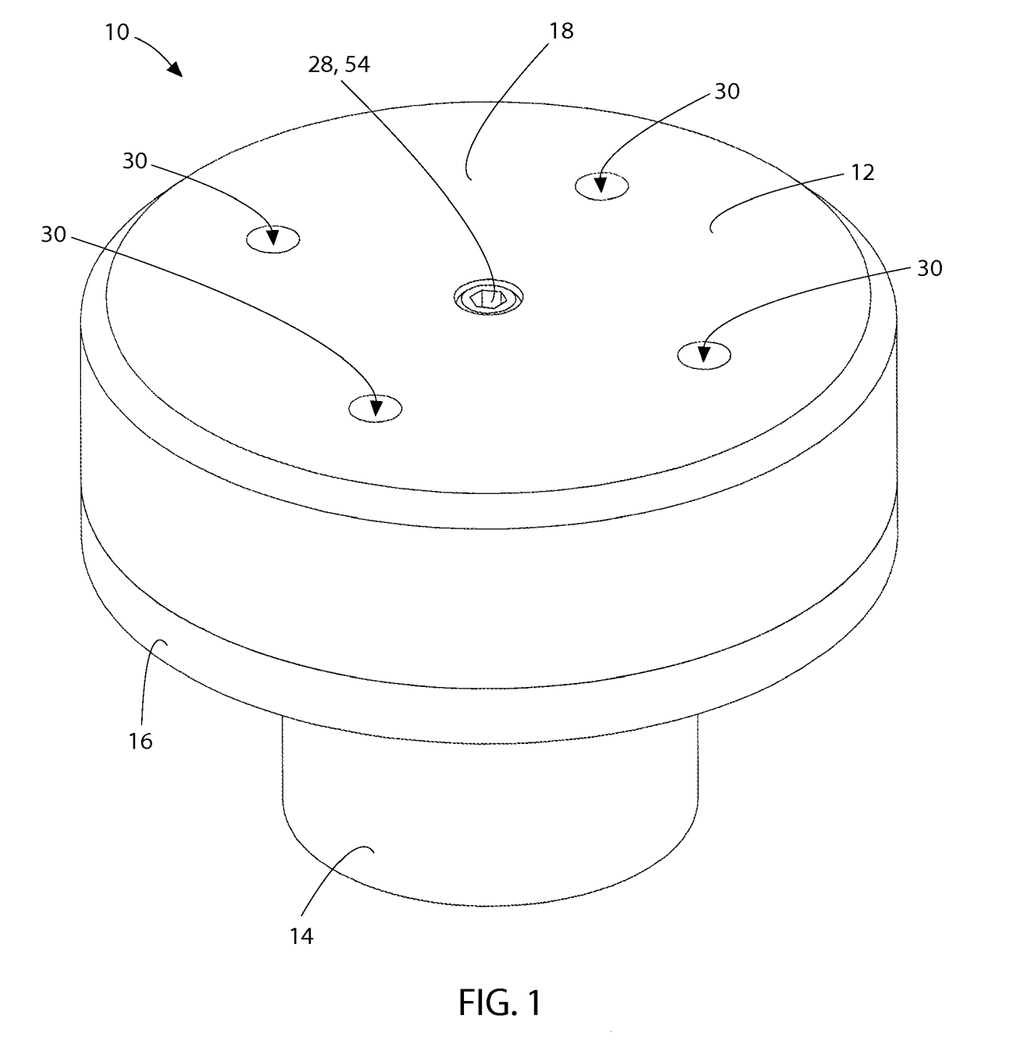
FIG. 1 is a perspective view of a torque limiter in accordance with the invention.
Figure 2:
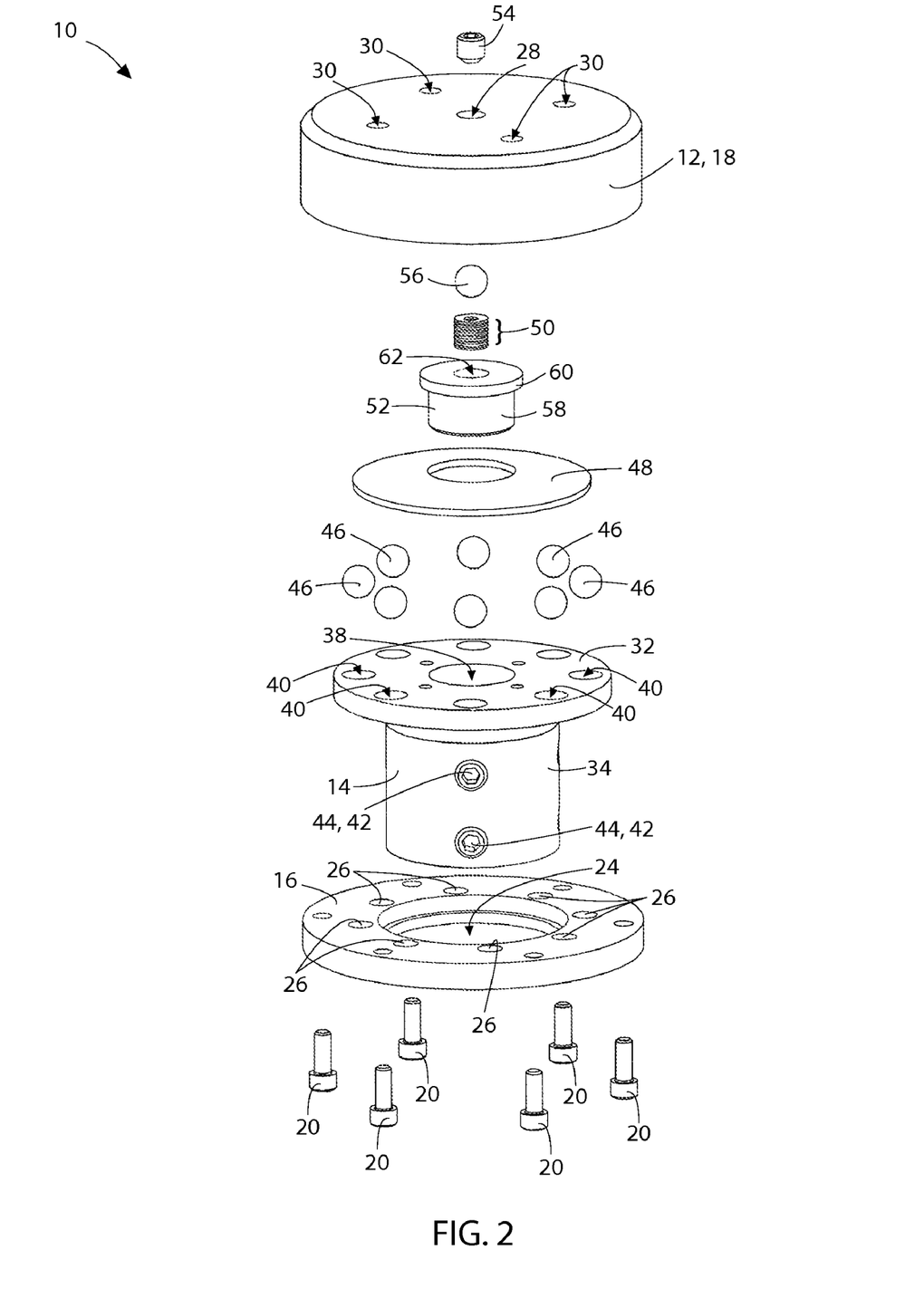
FIG. 2 is a exploded perspective view of the components of the torque limiter shown in FIG. 1.

The torque limiter 10 also comprises a plurality of detent bearings (preferably in the form of detent balls 46), a large Belleville spring 48, a set of smaller Belleville springs 50, an intermediate member 52, an adjustment screw 54, and an adjustment screw ball 56. The detent balls 46 are positioned in the detent ball holes 40 of the disked-shaped portion 32 of the second body 14. The large Belleville spring 50 engages the detent balls 46 from the side of disked-shaped portion 32 of the second body 14 opposite the baseplate 16 of the first body 12. Each small Belleville spring 50 preferably has an outer diameter that is less than the inner diameter of the large Belleville spring 48 and that is less than half, and more preferably approximately fifteen percent, of the outer diameter of the large Belleville spring. The intermediate member 52 comprises a generally cylindrical body portion 58 having a radially protruding lip 60 formed at one of its axially opposite ends. A cylindrical centrally positioned blind-hole 62 extends axially into the intermediate member 52 from the axial end of intermediate member that has the lip 60. The diameter of the body portion 58 of the intermediate member 52 is just slightly less than the inner diameter of the large Belleville spring 48. The diameter of the centrally positioned hole 62 of the intermediate member 52 is just slightly greater than the outer diameter of each of the small Belleville springs 50. The body portion 58 of the intermediate member 52 extends through the center hole of the large Belleville spring 48 and partially into the cylindrical pocket 38 of the disk shaped portion 32 of the second body 14. The set of small Belleville springs 50 are positioned in the centrally positioned hole 62 of the intermediate member 52. The lip 60 of the intermediate member 52 prevents the intermediate member from passing completely through the large Belleville spring 48. The adjustment screw 54 is threaded into the adjustment screw hole 28 of the cap 18 of the first body 12 and holds the adjustment screw ball 56 against the one end of the set of small Belleville springs 50.

Assembled as described above, the large Belleville spring 48 pushes against (exerts a downward force as viewed in FIG. 3) the detent balls 46. As such, the detent balls are biased toward the detent dimples 26 of the baseplate 16 of the first body 12 and partially extend thereinto when the detent ball holes 40 of the second body 14 are rotationally aligned with the detent dimples and the torque between the first body 12 and the second body is below a given torque-threshold. Below the given torque-threshold, the first body 12 and the second body 14 remain rotationally locked together (i.e., transmit torque below the torque-threshold) due to the interlocking geometry of the detent balls 46 and the detent dimples 26. If the torque is increased beyond the torque-threshold, the bias acting on the detent balls 46 is insufficient to prevent the detent balls from rolling out of the detent dimples 26 against the biasing force. As such, when the torque between the first body 12 and the second body 14 exceeds the given torque-threshold, the first and second bodies are able to rotate relative to each other. Thus, the torque transmitted from one of the first and second bodies to the other cannot exceed the given torque-threshold.

The torque-threshold of the torque limiter 10 of the present invention can easily and precisely be adjusted. By turning the adjustment screw 54 relative to the adjustment screw hole 28 in which it is threadably engaged, the adjustment screw and the adjustment screw ball 56 cause at least one of the small Belleville springs 50 and the large Belleville spring 48 to compress or expand. At one extreme, the springs can become completely expanded such that torque-threshold is effectively zero. Compressive adjustment of the springs from this extreme, initially causes each of the small Belleville springs 50 and the large Belleville spring 48 to compress, thereby increasing the biasing force acting on the detent balls 46 and therefore increasing the torque-threshold. Further compressive adjustment of the springs from this extreme at some point causes one more of the small Belleville springs 50 to reach a maximum compression condition (i.e., to bottom out or to effectively no longer continue to compress as a spring as the adjustment screw 54 is further adjusted), which increases the total compressive spring constant of the assembly for further adjustment beyond that point (from that point the spring constant is effectively equal to the spring constant of the large Belleville spring 48).

In the torque limiter 10 shown in the drawing figures, depending on how the small Belleville springs 50 are arranged relative to each other, all the small Belleville springs can bottom out simultaneously or some can bottom out before others (which in the latter case progressively increases the total compressive spring constant of the assembly). In an alternative configuration, the adjustment screw ball 56 (or some other component) can be dimensioned such that, as the small Belleville springs 50 are compressed in the centrally positioned hole 62 of the intermediate member 52, the adjust screw ball eventually engages intermediate member, thereby effectively causing all of the small Belleville springs to bottom out. Throughout the adjustment range of the torque-threshold, the large Belleville spring 48 continues to be either expanded or compressed by adjustments of the adjustment screw 54.

In view of the forgoing, it should be appreciated that the overall spring constant within the torque limiter 10 does not remain constant throughout the entire torque-threshold range. As such, the torque-threshold over the entire torque-threshold range is not directly proportional to the movement of the adjustment screw. This makes it possible for a single revolution of the adjustment screw 54 near the upper limit of the torque-threshold range to alter the torque-threshold by far more than does a single revolution of the adjustment screw when the torque-threshold is near the lower limit of the torque-threshold range. Hence, the torque-threshold can be precisely set throughout the entire torque-threshold range, and the entire torque-threshold range can be covered with relatively few revolutions of the adjustment screw 54. Providing the torque limiter 10 with springs whose individual spring constants differ significantly adds to the ability of the torque limiter to achieve this. Moreover, it should be appreciated that the small Belleville springs 50 can be arranged in various combinations wherein more or less of the springs are nested with each other (thereby working in parallel) or oppose each other (thereby working in series). This allows even finer adjustment capability at particular torque-thresholds and also allows the torque-threshold range to be adjusted. Still further, nesting some of the small Belleville springs 50 and not others allows there to be several different spring constants throughout a given torque-threshold range (given that the un-nested springs could bottom-out before all of the small Belleville springs collectively reach the maximum compression condition).

To further explain the foregoing, assume that the spring constant of each of the small Belleville springs 50 is constant and has a value of $K_s$ (where $K_s$ is an arbitrary value) and that the spring constant ($K_L$) of the large Belleville spring 48 is also constant and has a value of approximately $2 K_s$. In actuality the stiffness of each spring is not truly constant throughout its range of deflection. However as used herein, the phrase spring constant means the slope of the best fit linear approximation of the load versus deflection characteristics of a given spring. That being said, assuming the ten small Belleville springs 50 are arranged in series, the torque limiter 10 would then have an initial collective spring constant ($K_c$) as follows:

$$1/K_c = 1/(K_s/10) + 1/K_L = 1/(K_s/10) + 1/(2K_s) \approx 10.5/K_s;$$

$$K_c \approx 0.095 K_s$$

But throughout the portion of the torque-threshold range in which the small Belleville springs 50 are in their maximum compression condition, the collective spring constant would be equal to the spring constant of the large Belleville spring 48, namely $2 K_s$. Thus, the change in the biasing load per revolution of the adjustment screw 54 would be approximately twenty times greater near the upper limit of the torque-threshold range as compared to near the lower limit of the torque-threshold range. Alternatively, assuming that the ten small Belleville springs 50 are all arranged in parallel (i.e., nested), the torque limiter 10 would then have an initial collective spring constant as follows:

$$1/K_c = 1/(10 K_s) + 1/K_L = 1/(10 K_s) + 1/(2K_s) \approx 0.6/K_s;$$

$$K_c \approx 1.67 K_s$$

But again, throughout the portion of the torque-threshold range in which the small Belleville springs 50 are in their maximum compression condition, the collective spring constant is equal to the spring constant of the large Belleville spring 48, namely $2 K_s$. Thus in this case, the change in the biasing load per revolution of the adjustment screw 54 would be only about approximately 1.2 times greater near the upper limit of the torque-threshold range as compared to near the lower limit of the torque-threshold range. However, the magnitude of the upper limit of the torque-threshold range would be far greater than it would be in the alternative configuration mentioned previously. Given that the small Belleville springs 50 could be arranged in numerous configurations, the versatility of the torque limiter should therefore be appreciated.

In view of the foregoing, it should be appreciated that the invention achieves several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:
1. A torque limiter comprising:
a first body;
a second body, the second body being rotationally attached to the first body about an axis;
a biasing mechanism, the biasing mechanism comprising at least first and second compression springs and an adjustment device, the first compression spring occupying space between two planes that are perpendicular to the axis and intersect the first compression spring, the second compression spring at least partially occupying space between the two planes, the first compression spring having a maximum compression condition, the first and second compression springs being configured and adapted to create a torque threshold below which the second body cannot be rotated about the axis relative to the first body and above which the second body can be rotated about the axis relative to the first body, the torque threshold being adjustable via the adjustment device throughout a first torque range and a non overlapping second torque range, the biasing mechanism being configured and adapted such that the first compression spring progressively compresses as the torque threshold increases throughout the first torque range, and such that the first compression spring is in its maximum compression condition and the second compression spring progressively compresses as the torque threshold increases throughout the second torque range.

2. A torque limiter in accordance with claim 1 wherein the biasing mechanism is configured and adapted such that the second compression spring progressively compresses as the torque threshold increases throughout the first torque range.

3. A torque limiter in accordance with claim 2 wherein the first torque range and the second torque range are conterminous.

4. A torque limiter in accordance with claim 1 wherein the biasing mechanism comprises a plurality of ball bearings and a plurality of detents, the biasing mechanism is configured and adapted such that the ball bearings are locked in engagement with the detents when an applied torque between the first and second bodies is less than the torque threshold, and such that the ball bearings disengage the detents when such an applied torque between the first and second bodies is greater than the torque threshold, and the ball bearings each at least partially occupy space between the two planes.

5. A torque limiter in accordance with claim 4 wherein the biasing mechanism is configured and adapted such that the second compression spring progressively compresses as the torque threshold increases throughout the first torque range.

6. A torque limiter in accordance with claim 5 wherein the first torque range and the second torque range are conterminous.

7. A torque limiter in accordance with claim 4 wherein the first compression spring is aligned with the axis and has an outer diameter, the second compression spring is aligned with the axis and has an inner diameter that is larger than the outer diameter of the first compression spring, and the second compression spring encircles at least a portion of the first compression spring.

8. A torque limiter in accordance with claim 7 wherein the first compression spring comprises a stack of small Bellville springs and the second compression spring comprises at least one larger Bellville spring, and the larger Bellville spring encircles at least some of the small Bellville springs of the stack of the small Bellville springs.

9. A torque limiter in accordance with claim 1 wherein the adjustment device comprises an adjustment screw that is threadably attached to the first body.

10. A torque limiter in accordance with claim 9 wherein the compression springs are arranged and configured such that a first change of biasing load results from a single complete revolution of the adjustment screw relative to the first body when the torque limiter is in the first torque range and a second change of biasing load results from a single complete revolution of the adjustment screw relative to the first body when the torque limiter is in the second torque range, and wherein the compression springs are arranged and configured such that the second change of biasing load is at least ten times larger than the first change of biasing load.

11. A torque limiter in accordance with claim 10 wherein the compression springs are arranged and configured such that the second change of biasing load is at least twenty times larger than the first change of biasing load.

12. A torque limiter in accordance with claim 1 wherein the first compression spring is aligned with the axis and has an outer diameter, the second compression spring is aligned with the axis and has an inner diameter that is larger than the outer diameter of the first compression spring, and the second compression spring encircles at least a portion of the first compression spring.

13. A torque limiter in accordance with claim 12 wherein the first compression spring comprises a stack of small Bellville springs and the second compression spring comprises at least one larger Bellville spring, and the larger Bellville spring encircles at least some of the small Bellville springs of the stack of the small Bellville springs.

14. A torque limiter comprising:
a first body;
a second body, the second body being rotationally attached to the first body about an axis;
a biasing mechanism, the biasing mechanism comprising at least first and second compression springs, a plurality of ball bearings, a plurality of detents, and an adjustment device, the first compression spring occupying space between two planes that are perpendicular to the axis and that intersect the first compression spring, the first compression spring having a maximum compression condition, the ball bearings each at least partially occupy space between the two planes, the first and second compression springs being configured and adapted to create a torque threshold below which the second body cannot be rotated about the axis relative to the first body and above which the second body can be rotated about the axis relative to the first body, the torque threshold being adjustable via the adjustment device throughout a first torque range and a non overlapping second torque range, the biasing mechanism being configured and adapted such that the first compression spring progressively compresses as the torque threshold increases throughout the first torque range, and such that the first compression spring is in its maximum compression condition and the second compression spring progressively compresses as the torque threshold increases throughout the second torque range, the biasing mechanism being configured and adapted such that the ball bearings are locked in engagement with the detents when an applied torque between the first and second bodies is less than the torque threshold, and such that the ball bearings disengage the detents when such an applied torque between the first and second bodies is greater than the torque threshold.

15. A torque limiter in accordance with claim 14 wherein the biasing mechanism is configured and adapted such that the second compression spring progressively compresses as the torque threshold increases throughout the first torque range.

16. A torque limiter in accordance with claim 15 wherein the first torque range and the second torque range are conterminous.

17. A torque limiter in accordance with claim 14 wherein the adjustment device comprises an adjustment screw that is threadably attached to the first body.

18. A torque limiter in accordance with claim 17 wherein the compression springs are arranged and configured such that a first change of biasing load results from a single complete revolution of the adjustment screw relative to the first body when the torque limiter is in the first torque range and a second change of biasing load results from a single complete revolution of the adjustment screw relative to the first body when the torque limiter is in the second torque range, and wherein the compression springs are arranged and configured such that the second change of biasing load is at least ten times larger than the first change of biasing load.

19. A torque limiter in accordance with claim 18 wherein the compression springs are arranged and configured such that the second change of biasing load is at least twenty times larger than the first change of biasing load.

20. A torque limiter in accordance with claim 14 wherein the first compression spring is aligned with the axis and has an outer diameter, the second compression spring is aligned with the axis and has an inner diameter that is larger than the outer diameter of the first compression spring, and the second compression spring encircles at least a portion of the first compression spring.

21. A torque limiter in accordance with claim 20 wherein the first compression spring comprises a stack of small Bellville springs and the second compression spring comprises at least one larger Bellville spring, and the larger Bellville spring encircles at least some of the small Bellville springs of the stack of the small Bellville springs.

* * * * *